July 17, 1962 A. E. CRAVER ET AL 3,044,115
METHOD AND APPARATUS FOR PRODUCING FILMS
Filed Nov. 21, 1958

United States Patent Office 3,044,115
Patented July 17, 1962

3,044,115
METHOD AND APPARATUS FOR PRODUCING FILMS
Augustus E. Craver, Fredericksburg, Va., and William H. Lamason, Wallingford, Pa., assignors to American Viscose Corporation, Philadelphia, Pa., a corporation of Delaware
Filed Nov. 21, 1958, Ser. No. 775,467
12 Claims. (Cl. 18—15)

The invention relates to the simultaneous production of a plurality of films, and more particularly to a method and apparatus for more efficiently making two or more films of improved quality at the same time.

In the simultaneous manufacture of a plurality of films as suggested by the prior patents, freshly formed films are brought together, either within or after leaving the coagulating bath, and are then maintained in this contact relation while being advanced into and through the regenerating and subsequent after-treating liquids. In an alternative known procedure, a plurality of freshly coagulated films are passed into a regenerating bath where only certain of the films are separated from each other and are then advanced through the remaining after-treating liquids while being maintained in separated relation. While maintaining the plurality of films in contact relation, or alternatively certain of the films in separated condition, throughout the regenerating and subsequent liquid-treating stages may perhaps contribute in providing a simple film-lacing pattern, neither of the above-disclosed procedures, or other similar known methods, has been entirely satisfactory from the operational standpoint or the quality of the film produced.

It has been recently found that improved operation and film uniformity can be achieved by separating the plurality of films from each to permit the escape of vapors and gaseous products that are formed between the films. Indiscriminate separation of the films along their path of travel, however, serves merely to complicate the lacing pattern and may introduce quality variations between the different films being simultaneously produced and/or along the length of the individual films themselves. Accordingly, it is a primary object of the present invention to provide a new or generally improved and more satisfactory method and apparatus for simultaneously making a plurality of films.

Another object of the invention is to provide an improved method and apparatus for simultaneously and more efficiently forming and liquid-treating a plurality of films on a single machine whereby films of improved quality are obtained.

Still another object of this invention is to provide a method and apparatus wherein a plurality of simultaneously formed films are separated from each other at selected locations to permit the escape of vapors and gases without any sacrifice in film quality or uniformity.

A further object of the invention is the provision of an improved method and apparatus wherein a plurality of simultaneously formed films are directed along paths of substantially equal length while being separated to permit the escape of vapors and gases from therebetween and permit the films to shrink to an equal degree.

A still further object is to provide a method and apparatus which facilitate the combining of a plurality of freshly formed films in an improved manner which minimizes the tendency for the films to tear.

These and other objects and advantages of the invention will be apparent from the following description and accompanying drawing in which.

Figure 1:
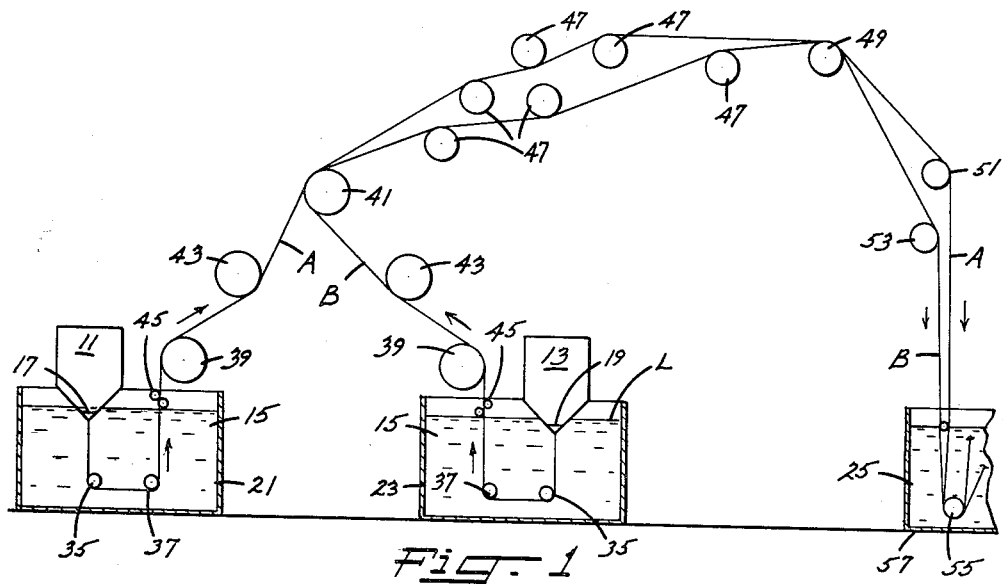
FIGURE 1 is a side view of a portion of the apparatus of the present invention diagrammatically illustrating the paths of the plurality of films during their initial coagulation and regeneration stage.

In general, with the method and apparatus of the present invention a plurality of individual films are simultaneously formed by extruding film-forming material, as for example viscose, into coagulating and regenerating liquid through slit-like nozzles. The plurality of at least partially coagulated films are positioned together with their adjacent surfaces in contact relation and are then advanced through the coagulating and regenerating liquids, and a series of conventional liquid after-treatments, as for example washing, desulfurizing, bleaching, and softening or plasticizing. During their travel through the coagulating and regeneration liquid, the films are periodically extended into the air above the liquid level and separated from each other to permit the escape of vapors and gases, as for example hydrogen sulfide gas which is evolved in substantial quantities when viscose is extruded into an acid coagulating and regenerating bath. Since the films undergo substantial shrinkage during initial coagulation and regeneration stages means, referred to as the camel back, direct the films along paths of substantially equal length during the first separation thereof in the air above the liquid to thus permit the films to shrink freely and to substantially the same degree. Following the film regeneration stage, the films enter and are advanced through the after-treating liquids with their adjacent surfaces maintained in contact relation, after which the films are dried by any suitable apparatus. If desired the films may be separated during their passage through the softening liquid to permit all film surfaces to be treated uniformly and to effect more rapid film plasticizing.

The apparatus of the present invention, and especially that portion within which initial extrusion of film-forming material takes place, is so constructed as to facilitate withdrawal of the films from the coagulating liquid along generally vertical paths to thereby minimize the stresses to which the freshly formed films are subjected.

The teachings of the present invention are applicable to the casting of two or more films simultaneously from various coagulable film-forming hydrophilic colloids such as, for example viscose, aqueous solutions of cellulose in inorganic or organic solvents such as zinc chloride, cupra ammonia, organic amines and the like, also water-soluble and alkali-soluble cellulose ethers, gelatin, casein, and water-soluble vinyl acetate and polyvinyl alcohol and the like. The term "film," as used above and hereinafter, is intended to include any of these classes of materials, all of which are capable of being coagulated in the form of a continuous film from their aqueous dispersions. Further, the expression "coagulating liquid," as employed throughout the description and claims, includes liquids which serve both as coagulating and regenerating mediums, as for example when viscose is used as the film-forming material.

With reference to the drawing, a plurality of films, such as indicated at A and B, are simultaneously formed by extruding film-forming material, such as viscose, from hoppers 11 and 13 downwardly into heated coagulating liquid 15 through conventional nozzles 17 and 19. The coagulating liquid 15 may be contained in a single large tank, but is preferably delivered into a series of separate spaced tanks, as for example as shown at 21 and 23, to permit the operator to more easily lace and inspect the films, and to facilitate a better control over the circulation of the coagulating liquid. The at least partially coagulated films are withdrawn from the coagulating liquid 15 and are then directed simultaneously into a coagulating and/or regenerating liquid 25 and subsequently through successive after-treating stages, such as washing, desulfurizing, bleaching, and softening or plasticizing liquids, indicated generally in FIGURE 3 at 27, 29, 31 and 33. The level of the various liquids are indicated on the drawing by the reference character L, and it will be understood that the individual after-treating liquids may be contained in one or more tanks, as for example to achieve greater control over the circulations thereof.

While coagulation of film-forming material is initiated immediately upon its entry into the coagulating liquid 15, it will be readily appreciated that at this stage the films A and B are still in a gel and relatively weak condition. With conventional equipment, film-tearing soon after initial extrusion has long been a troublesome problem. Elimination or at least minimizing of this tendency for the weak films to tear has been achieved with the present invention by passing the individual films A and B about the guide rods 35 and 37 and then withdrawing the same from the coagulating liquid 15 along substantially vertical paths by driven rolers 39. It will be noted that with this procedure each of the films A and B follow a generally straight upward course of travel and are thus not subject to bowing. From the rollers 39, the films travel to a roller 41 where they are positioned together with their adjacent faces in contact relation. Rollers 43 are disposed intermediate the rollers 39 and 41 for deflecting each of the films from a straight course of travel to insure that the films contact a substantial peripheral portion of the driven rollers 39. While wipers 45 are provided to remove excess coagulating liquid from the films before they are passed about the rollers 39, it will be noted that the films themselves travel generally upwardly-extending paths which further assist in proper liquid drainage and avoids puddling or stagnant accumulations of coagulating liquid.

As a result of the reaction of the coagulating liquid on the film-forming material, and the elevated temperature of the coagulating liquid itself, a considerable amount of gases and vapors are evolved during this initial stage of the process. In the conventional multi-film manufacture, the reaction gases and vapors collect between the films in the form of pockets or bags which bow the films and impart undesirable wrinkles to the surfaces thereof. As the films advance along their normal path, the gas and vapor pockets are worked or travel laterally across the films, and eventually escape from between the films with a considerable force which imparts a vibrating or fluttering movement to the film edges. With the slackening of the films as the gases and vapors are released, at least one of the fluttering film edges tends to fold over, a result which most often initiates tearing of one or more of the plurality of films.

In the present invention, however, the films A and B are separated from each other by a series of rollers 47 and are then again positioned together as they are passed over a roller 49. This separation of the films almost immediately after they have been brought together provides no opportunity for the gases and vapors to accumulate between the films and facilitates the gas and vapor escape during a period at which they are being rapidly evolved. Further, since the films at this early stage of the process generally undergo maximum shrinkage, the rollers 47 are preferably positioned to direct the films A and B along paths of substantially equal during the separation, thereby allowing the films to shrink freely and to an equal degree.

Figure 2:
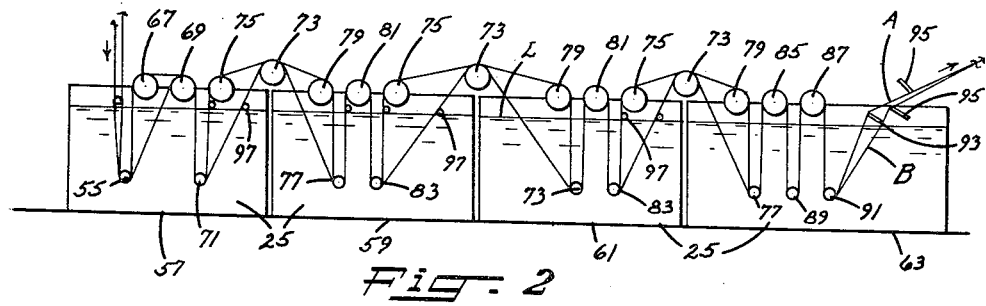
FIGURE 2 is a view similar to FIGURE 1 showing a continuation of the apparatus of FIGURE 1.

After leaving the roller 49, the films A and B are again separated from each other by passing the same over spaced guide means 51 and 53 and are then brought together as they pass about a guide rod 55 immersed within a coagulating and/or regenerating liquid 25. The liquid 25 may also be contained in a single tank, or alternatively, as shown in FIGURE 2, in a series of smaller tanks 57, 59, 61 and 63 which facilitate a better control over the liquid circulation. Further, in the event that the liquids 15 and 25 are of similar composition and serve both as a coagulating and regenerating medium, the tanks 21, 23, 57, 59, 61 and 63 may be combined into a single long tank if desired.

Within the coagulating and/or regenerating liquid 25, the films are separated a number of times. The first film separation is preferably effected as the films leave the rod 55, with the upper film A being passed over a roller 67 and then to a roller 69, while the lower film B travels directly to the roller 69 where it is again positioned in contact with the film A. Traveling together, the films A and B move downwardly into the liquid 25 and about a guide rod 71, after which the films are again separated as they travel to a roller 73 disposed above the liquid level. During this separation, the film A moves upwardly along a substantially vertical path to a roller 75 and then forwardly to the roller 73 where it again contacts film B. This contact between the films is only momentary for as the films enter the tank 59 and advance downwardly toward a guide rod 77, the film A is again separated from the film B by a roller 79. An elevated roller 81 and a submerged rod 83 cooperate with the rod 77 in conveying the films A and B along a sinuous path with their adjacent surfaces in contact relation. Rollers 73 and 75 separate and advance the films out of the tank 59 in the same manner as heretofore described.

The travel of the films A and B through and out from the tank 61 is generally similar to that described with reference to tank 59. Rollers 85 and 87 and submerged rods 89 and 91 advance and guide the films A and B through the liquid contained in the tank 63 with the film surfaces held in contact relation. As the films are withdrawn from the tank 63, wipers 93 and 95 engage with the surfaces thereof to remove excess liquid therefrom. If desired, additional wipers, such as shown at 97, may be placed at selected locations for removing liquid from the films as they travel out of the respective tanks.

During the travel of the films through the coagulating and/or regenerating liquid in tanks 57, 59, 61 and 63, film shrinkage is not as pronounced and thus directing the films A and B along paths of substantially equal length is neither essential nor desirable. Actually, repositioning the films together at successive points staggered along the length of the films leads to greater film uniformity.

As heretofore mentioned, following coagulation and regeneration, the films A and B are sequentially passed through a series of after-treating liquids, as for example washing, desulfurizing, bleaching and softening or plasticizing liquids contained in tanks 99, 101, 103 and 105, respectively. The respective after-treating liquids may be each contained in a single tank or a series of tanks, as desired.

Figure 3:
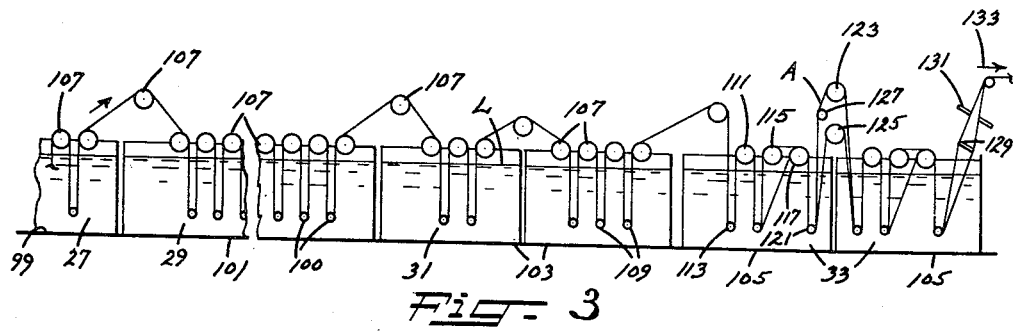
FIGURE 3 is a shortened side view showing a continuation of the apparatus of FIGURE 2 and illustrating the path of the films during the after-treating liquid stages.

Of particular importance at this stage of the process is that the plurality of films are passed through the series of after-treating liquids with their adjacent surfaces maintained in contact relation. Thus, as shown in FIGURE 3, the contacting films A and B are advanced through the after-treating liquids along a generally sinuous path by rollers 107 and submerged guide rods 109, with certain of the rollers 107 being disposed at elevated positions to more efficiently transfer the films from one tank to another. To effect a faster and more complete plasticizing of the films, it is preferred that they be separated at least once during their advancement through the softening liquid. Thus, as shown in FIGURE 3, the films A and B initially travel a sinuous path through the softening liquid over and about rollers 111 and rods 113, and are then separated by a roller 115 which deflects the film A from the straight-line course followed by film B to a roller 117. The films A and B leave the roller 117 together and, after passing about a submerged guide rod 121, are separated and advanced into the second plasticizing tank 105 by a pair of vertically spaced rollers 123 and 125. During this travel, the lower surface of the film A is deflected along a generally vertical path of travel by a roller 127 to facilitate a greater degree of film separation. The travel of the films in the second plasticizing tank is similar to that described above with regard to the first plasticizing tank. Excess softening liquid is removed from all surfaces of the films A and B by wipers 129 and 131 after which the films are passed into a drying stage as indicated by the arrow 133.

As heretofore mentioned, the primary objectives of conventional multi-film manufacture have been to provide a simple film-lacing pattern and to subject each of the plurality of films to exactly the same treatment. However, from the above description of the present invention, it is apparent that film separations are essential both from the standpoint of efficient operation and the quality of the film produced. Further, separating of the films from each other at the select locations and in the manner as described above minimizes the number of film separations required, and thus the present invention permits the achievement of highly desirable and unexpected results with only a slight sacrifice in the simplicity of the film-lacing pattern.

While preferred embodiments of the invention have been shown and described, it is to be understood that changes and variations may be made without departing from the spirit and scope of the invention as defined by the appended claims.

We claim:

1. A method of forming a plurality of films including the steps of extruding film-forming material through a plurality of nozzles into coagulating liquid, advancing the at least partially coagulated films through and above the level of the coagulating liquid and thereafter positioning the same together with their adjacent surfaces in contact relation, separating from each other only those portions of the films which are above the level of the coagulating liquid, positioning the films together after separation thereof, and passing the films into and through after-treating liquid with their adjacent surfaces maintained in contact relation.

2. A method as defined in claim 1 wherein the films are directed along paths of substantially equal length during the separation thereof.

3. A method as defined in claim 1 wherein the films are passed through a plurality of different after-treating liquids and into the last of the after-treating liquids with their adjacent surfaces in contact relation, and further including the steps of advancing the films through the last of the after-treating liquids while separating the same from each other at least once during the advancement thereof, withdrawing the films from the last after-treating liquid, and drying the films.

4. A method of forming a plurality of films including the steps of extruding film-forming material through a plurality of laterally spaced nozzles into coagulating liquid, advancing the at least partially coagulated films through and above the level of the coagulating liquid and thereafter positioning the same together with their adjacent surfaces in contact relation, separating from each other at least once portions of the films extended above the level of coagulating liquid, directing the films along substantially equal paths during the first separation thereof, returning the films to the coagulating liquid after separation thereof, withdrawing the films from the coagulating liquid with their adjacent surfaces in contact relation, and passing the films into and through after-treating liquid with their adjacent surfaces maintained in contact relation.

5. A method of forming a plurality of films including the steps of extruding film-forming material through a pair of laterally spaced nozzles into coagulating liquid, advancing the at least partially coagulated films through and above the level of the coagulating liquid and thereafter positioning the same together with their adjacent surfaces in contact relation, separating from each other only those portions of the films extended above the level of coagulating liquid, returning the films to the coagulating liquid after separation thereof, positioning the films together as they are returned to the coagulating liquid, further advancing the films through the coagulating liquid, extending the films above the level of coagulating liquid at least once during the further advancement thereof, further separating portions of the films from each other while they extend at least partially above the level of the coagulating liquid, positioning the films together after separation thereof, withdrawing the films from the coagulating liquid, and passing the films into and through after-treating liquids with their adjacent surfaces maintained in contact relation.

6. A method as defined in claim 5 wherein the films are directed along paths of substantially equal length during the first separation thereof.

7. A method as defined in claim 5 wherein the films are directed along paths of substantially equal length during the first separation thereof, and along paths of unequal length during subsequent separation thereof.

8. A method of forming a plurality of films including the steps of extruding film-forming material through a pair of laterally spaced nozzles vertically downward into coagulating liquid, passing the at least partially coagulated films through the coagulating liquid along generally horizontal paths directed toward each other and then along generally parallel vertical paths extending upward toward and above the level of coagulating liquid, positioning the films together with their adjacent surfaces in contact relation, advancing the films above the level of coagulating liquid, separating portions of the contacting films from each other at least once during the advancement thereof, returning the films to the coagulating liquid and passing the same therethrough, withdrawing the films from the coagulating liquid, and passing the films into and through after-treating liquid with their adjacent surfaces maintained in contact.

9. A method of forming a plurality of films including the steps of extruding film-forming material through a plurality of nozzles into coagulating liquid, advancing the at least partially coagulated films through and above the level of the coagulating liquid and thereafter positioning the same together with their adjacent surfaces in contact relation, separating from each other only those portions of the films which extend above the level of the coagulating liquid, passing the films into regenerating liquid with their adjacent surfaces in contact relation, advancing the films through the regenerating liquid and extending the same above the level of the regenerating liquid at least once during the advancement thereof, separating portions of the films from each other while they extend at least partially above the level of regenerating liquid, positioning the films together after separation thereof, and passing the film into and through after-treating liquids with their adjacent surfaces maintained in contact relation.

10. Apparatus for forming a plurality of films including a tank for containing coagulating liquid, a pair of laterally-spaced nozzles positioned adjacent to said tank for extruding film-forming material downwardly into said tank, guide members within said tank for directing the freshly formed films from said nozzles and toward each other, means positioned above the level of the coagulating liquid for positioning the films together with their adjacent surfaces in contact relation as they are withdrawn from said tank, a second tank for containing coagulating liquid, a series of rollers for directing the film along an arcuate path between said first and second tanks and for separating from each other only those portions of the films which extend above the level of the coagulating liquid in said tanks, means for positioning the films together after the separation thereof and for directing the same into and through the liquid in said second tank, means for containing after-treating liquid and means for passing the films into and through the after-treating liquid with their adjacent surfaces maintained in contacting relationship.

11. An apparatus as defined in claim 10 wherein said series of rollers are positioned to guide the films along substantially equal paths during the separation thereof.

12. A method as defined in claim 1 further including the steps of returning the films into coagulating liquid after separation and repositioning of the same into contacting relationship, advancing the films through the coagulating liquid with their adjacent surfaces in contacting relationship, extending the films above the level of the coagulating liquid at least once during their advancement therethrough, separating portions of the contacting films from each other while they extend at least partially above the level of the coagulating liquid and directing the same along paths of unequal length during such subsequent separation thereof.

References Cited in the file of this patent

UNITED STATES PATENTS

| | | |
|---|---|---|
| 2,494,951 | Lindquist | Jan. 17, 1950 |
| 2,704,860 | Russell | Mar. 29, 1955 |
| 2,770,015 | Rosser et al. | Nov. 13, 1956 |
| 2,862,245 | Reichel et al. | Dec. 2, 1958 |

FOREIGN PATENTS

| | | |
|---|---|---|
| 468,267 | Canada | Sept. 19, 1950 |